United States Patent [19]

Hayashi et al.

[11] Patent Number: 4,702,339

[45] Date of Patent: Oct. 27, 1987

[54] REAR WHEEL BRAKING APPARATUS FOR MOTORCYCLE

[75] Inventors: Tsutomu Hayashi, Tokyo; Takeshi Kawaguchi; Tetsuo Tsuchida, both of Saitama, all of Japan

[73] Assignee: Honda Giken Kogyo Kabushiki Kaisha, Tokyo, Japan

[21] Appl. No.: 748,495

[22] Filed: Jun. 25, 1985

[30] Foreign Application Priority Data

Jun. 26, 1984 [JP] Japan ................ 59-131752

[51] Int. Cl.$^4$ ............ B60T 8/093; B62K 25/26; B62K 25/28

[52] U.S. Cl. ................ 180/219; 180/226; 180/231; 180/282; 188/181 A; 280/703; 303/115; 303/116

[58] Field of Search ........... 180/226, 197, 231, 275, 180/282, 285, 219, 227; 280/276, 284, 285, 286, 288, 703; 188/181 A, 181 R; 303/115, 116

[56] References Cited

U.S. PATENT DOCUMENTS

| | | | |
|---|---|---|---|
| 2,329,249 | 9/1943 | Carlson | 280/276 X |
| 2,954,237 | 9/1960 | Sampietro | 280/703 |
| 3,537,715 | 11/1970 | Gualdoni | 280/703 X |
| 3,542,145 | 11/1970 | Proffer | 180/219 |
| 3,655,016 | 4/1972 | Watanabe | 188/2 A X |
| 3,989,261 | 11/1976 | Kawaguchi | 188/272 X |
| 4,159,123 | 6/1979 | Petty | 188/272 X |
| 4,336,859 | 6/1982 | Leitner | 180/226 |
| 4,353,440 | 10/1982 | Farr | 188/181 A |
| 4,437,678 | 3/1984 | Schultz | 280/703 X |
| 4,445,585 | 5/1984 | Imani | 180/219 |
| 4,456,310 | 6/1984 | Hayashi et al. | 303/119 X |
| 4,465,322 | 8/1984 | Hayashi | 303/6 A |
| 4,475,774 | 10/1984 | Davis | 303/112 |
| 4,492,284 | 1/1985 | Hayashi | 180/219 |
| 4,515,384 | 5/1985 | Honma et al. | 280/276 |
| 4,552,373 | 11/1985 | Kawaguchi et al. | 280/703 X |
| 4,572,317 | 2/1986 | Isono et al. | 180/227 |

FOREIGN PATENT DOCUMENTS 2070166 9/1981 United Kingdom ........... 188/181 A

Primary Examiner—David M. Mitchell
Assistant Examiner—Mitchell J. Hill
Attorney, Agent, or Firm—Lyon & Lyon

[57] ABSTRACT

A rear wheel braking apparatus for a motorcycle wherein a rear fork with a rear wheel pivotally mounted on the rear end thereof is coupled to the frame of the motorcycle via a pivot shaft in a vertically swingable manner; a rear wheel drive device for coupling between the output shaft of an engine on the frame and the rear wheel is provided side by side with the rear fork; an anti-lock controlling unit for controlling the braking hydraulic pressure to be fed to the rear brake in response to the output from a built-in sensor is provided on the rear fork in the vicinity of the pivot shaft; and wherein the drive shaft of the sensor is coupled to the rear wheel drive device.

16 Claims, 8 Drawing Figures

FIG. 5

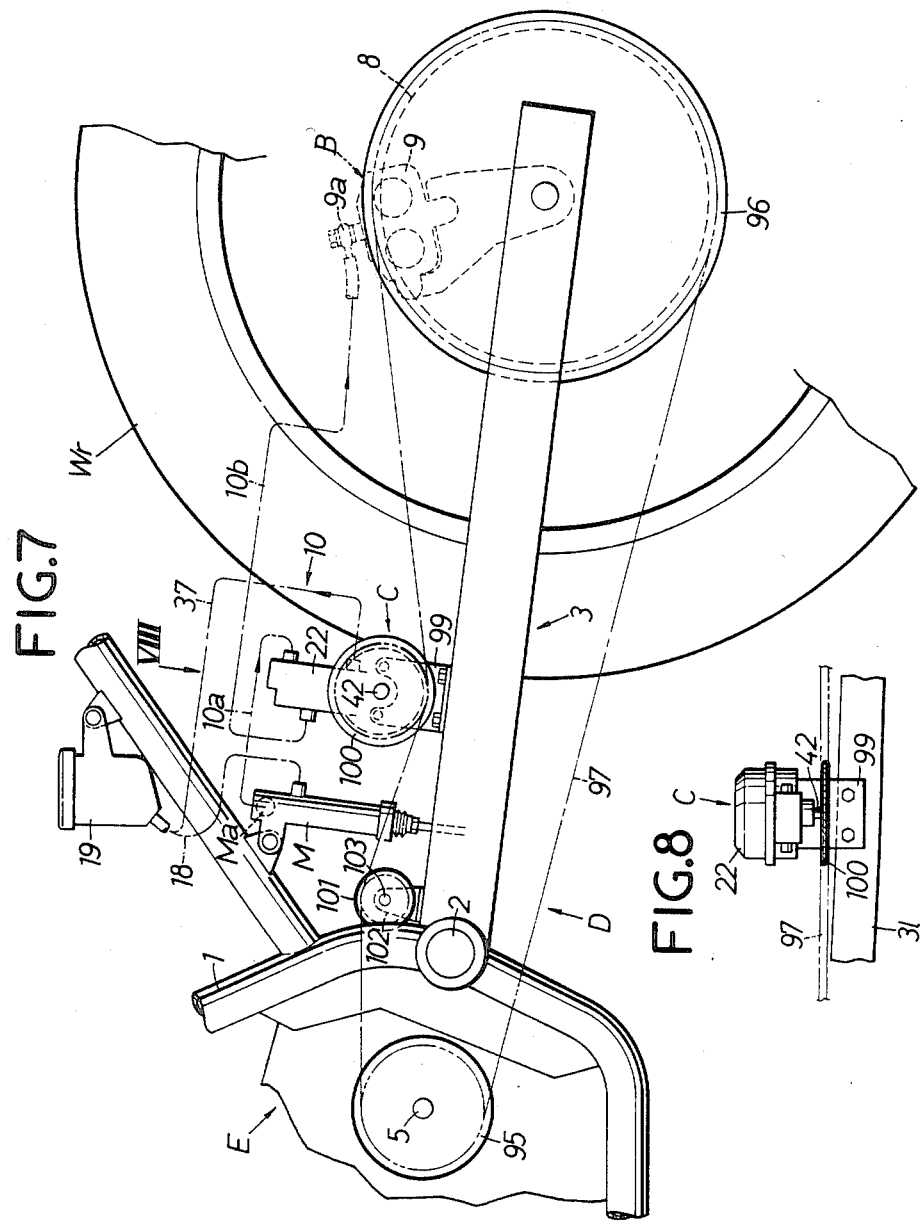

REAR WHEEL BRAKING APPARATUS FOR MOTORCYCLE

BACKGROUND OF THE INVENTION

1. Field of the Invention

The field of the present invention, is braking apparatus for motorcycles and particularly for the rear wheel thereof.

2. Description of the Prior Art

It is necessary for an inertia-type wheel angular deceleration sensor to be driven at a speed faster than that of rotation of a wheel in order to sensitively detect the change in magnitude of the angular deceleration of the wheel by means of as light a flywheel as possible. Consequently, in a conventional braking apparatus for a vehicle, a wheel and the drive shaft of a sensor are coupled together by means of an exclusively-used overdrive transmission (e.g., Japanese Patent Laid Open No. 120440/1981).

However, if an attempt is made to use a braking apparatus having such an overdrive transmission in the rear wheel braking apparatus of a motorcycle, it is necessary to specially couple the overdrive transmission, in addition to the rear wheel drive device, to the rear wheel. For this reason, there arise certain problems. The structure around the rear wheel is complicated, and the rear portion of the motorcycle is made bulky, together with the fact that the external dimensions of the overdrive transmission are relatively large.

SUMMARY OF THE INVENTION

The present invention has been proposed in view of the above circumstances and has as its object the provision of a rear wheel braking apparatus wherein the sensor of an anti-lock controlling unit is driven at a speed higher then the wheel with use of a rear wheel drive device. Through such an arrangement the structure around the rear wheel is made less complicated and smaller in size and minimizes the effect to be exerted by a violent vertical swinging motion of the rear fork on the anti-lock controlling unit.

To attain the aforementioned object, according to the present invention, there is provided a rear wheel braking apparatus which comprises: a master cylinder installed on a vehicle frame, a rear wheel brake operable by an output hydraulic pressure of the master cylinder to apply a braking force to the rear wheel; and an anti-lock controlling unit incorporated with an inertia-type wheel angular deceleration sensor operatively connected with the rear wheel. This unit controls hydraulic pressure to be inputted to the rear wheel brake in response to an output from the sensor. The anti-lock controlling unit is installed on the rear fork in close proximity to the pivot shaft and the drive shaft of the sensor is coupled with the rear wheel drive device.

With the aforementioned arrangement, the wheel angular deceleration sensor can be operatively connected with the rear wheel via the rear wheel drive device and can be driven at a speed faster than that of the rear wheel without using a conventional overdrive transmission, thereby making it possible to sensitively detect the change in the angular deceleration of the rear wheel. Additionally, it becomes possible to keep the structure around the rear wheel from becoming complicated and large.

Furthermore, the lifting and descending stroke of the anti-lock controlling unit at the time of vertical swinging of the rear fork can be made much smaller than that of the rear wheel. In this way, any influence exerted by the vertical swinging of the rear fork upon the anti-lock controlling unit becomes small, which, together with the high sensitivety of the sensor, enables a favorable anti-locking operation to be attained for the rear wheel.

Moreover, the deflection of the hydraulic conduits connecting the anti-lock controlling unit and the master cylinder due to the vertical swinging of the rear fork may be kept at a small level. This permits the length of such conduits required to allow for slackness to be made small. This result is extremely advantageous in terms of piping. Furthermore, since the, mounting of the anti-lock controlling unit has little effect on the inertia moment of the rear fork, the ability of the rear wheel to follow the road surface is not impaired. This is advantageous in ensuring excellent riding comfort.

The above and other objects, features and advantages of the invention will become more apparent from the following detailed description of the preferred embodiments when considered in connection with the accompanying drawings.

BRIEF DESCRIPTION OF THE DRAWINGS

FIGS. 1 through 6 show a first embodiment of the present invention, in which:

FIG. 1 is a side elevational view of a motorcycle;

FIG. 2 is an enlarged side elevational view of its essential parts;

FIG. 3 is a top plan view partly in section of those parts shown in FIG. 2;

FIG. 4 is a front view of an antilock controlling unit in vertical section; and

FIGS. 5 and 6 are cross sectional views taken along lines V—V and VI—VI of FIG. 4, respectively.

FIG. 7 is a side view of a part of a motorcycle according to a second embodiment of the present invention; and FIG. 8 is a view taken in the direction of an arrow VIII of FIG. 7.

DESCRIPTION OF THE PREFERRED EMBODIMENTS

Figure 1:
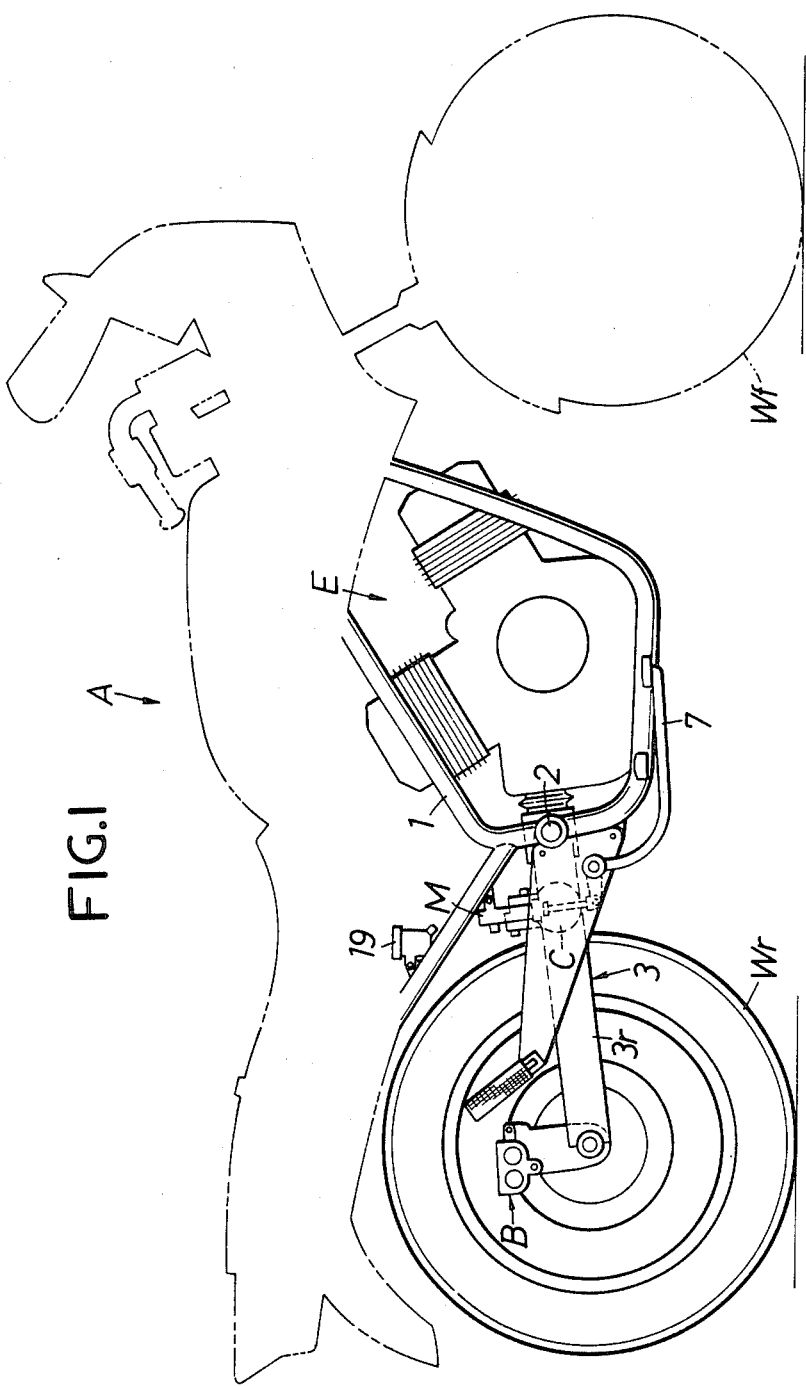
Figure 2:
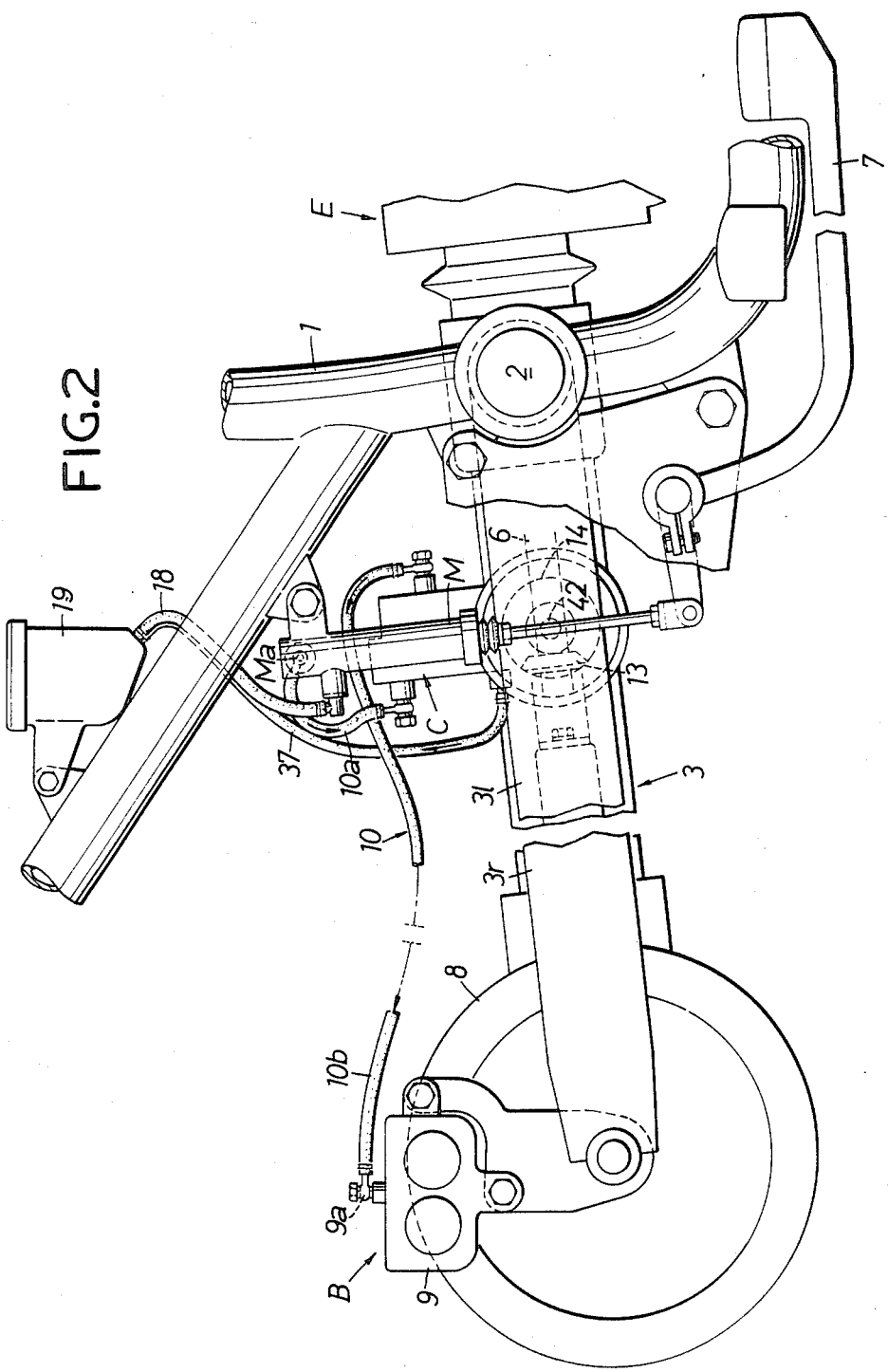
Figure 3:
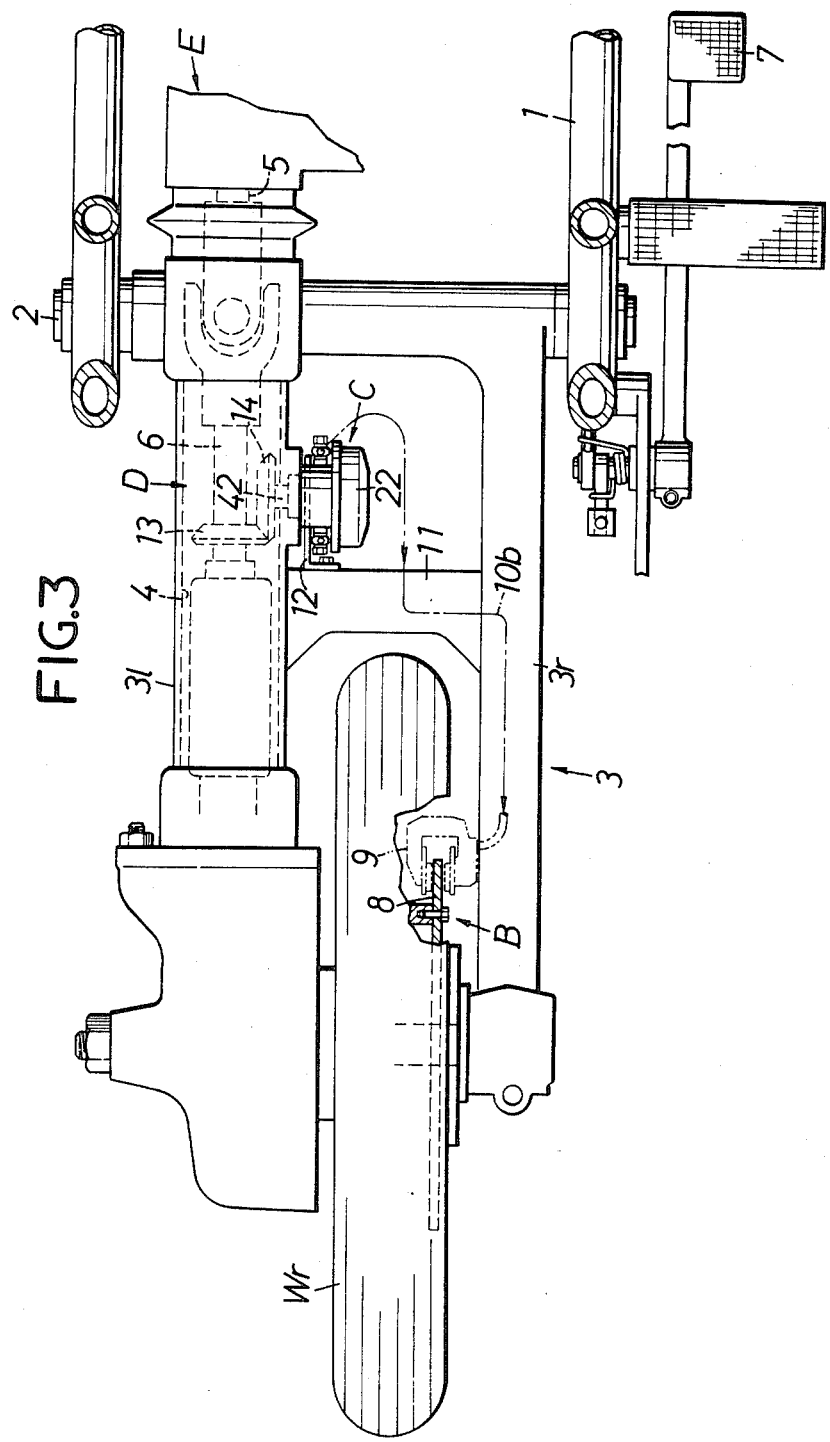

Description will be made hereinafter of some embodiments of the present invention with reference to the drawings. First, in FIGS. 1 to 3, which show a first embodiment, an engine E is mounted on the vehicle frame 1 of a motorcycle A in the central portion between a front wheel Wf and a rear wheel Wr. The rear wheel Wr is pivotally supported by the rear end of a rear fork 3 which is coupled via a pivot shaft 2 to the vehicle frame 1 at a portion thereof located immediately behind the engine E so as to be vertically swingable, and a suspension spring (not shown) is mounted between the rear fork 3 and the vehicle frame 1.

The rear fork 3 has a pair of fork legs 3*l* and 3*r* arranged on both sides of the rear wheel Wr. Of these fork legs, the left-side fork leg 3*l* is formed to be hollow in order to define a transmission chamber 4 inside it. In the transmission chamber 4 is housed a shaft-drive type rear wheel drive device D including a propeller shaft 6, which device connects between an out-put shaft 5 of the engine E and a hub of the rear wheel Wr. Accordingly, the power of the engine E is transmitted from the output shaft 5 to the rear wheel Wr via the rear wheel drive device D to drive the wheel.

Rear wheel braking apparatus of the motorcycle A comprises a rear wheel brake B provided on the rear wheel Wr, a master cylinder M installed on the vehicle frame in a manner operable by a brake pedal 7, an oil tank 19 provided immediately above the master cylinder M and adapted to replenish hydraulic oil to the same via an oil conduit 18, and an anti-lock controlling unit C positioned near the pivot shaft 2 and installed on the rear fork 3.

The rear wheel brake B comprises a brake disk 8 secured to the hub of the rear wheel Wr and a brake caliper 9 straddling this brake disk 8 and supported by the axle of the rear wheel Wr and the right-side fork leg 3r. The brake caliper 9 is operated with input of hydraulic pressure to clamp the brake disk 8, thereby applying braking force.

A hydraulic conduit 10 extends from an output port Ma of the aforementioned master cylinder M and is connected to an input port 9a of the brake caliper 9. The anti-lock controlling unit C is interposed midway in this hydraulic conduit 10.

The anti-lock controlling unit C is mounted on the rear fork 3 in such a manner that its casing 22 is secured via a bracket 12 to a cross member 11 coupling between the two fork legs 3l and 3r. A drive shaft 42 of the unit C projects from one side of the casing 22 and extends into the transmission chamber 4 of the fork leg 3l from the inner side surface of the leg, the shaft 42 being coupled with the propeller shaft 6 via a pair of bevel gears 13 and 14.

Figure 4:
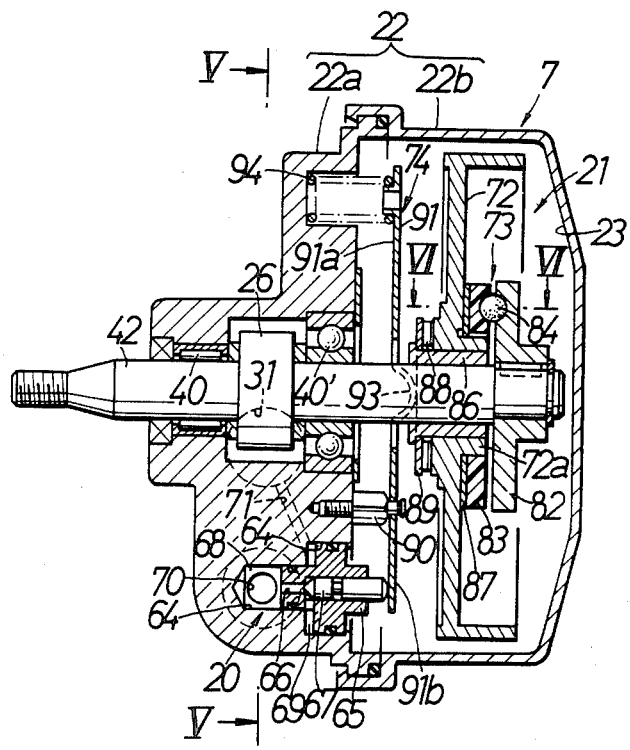
Figure 5:
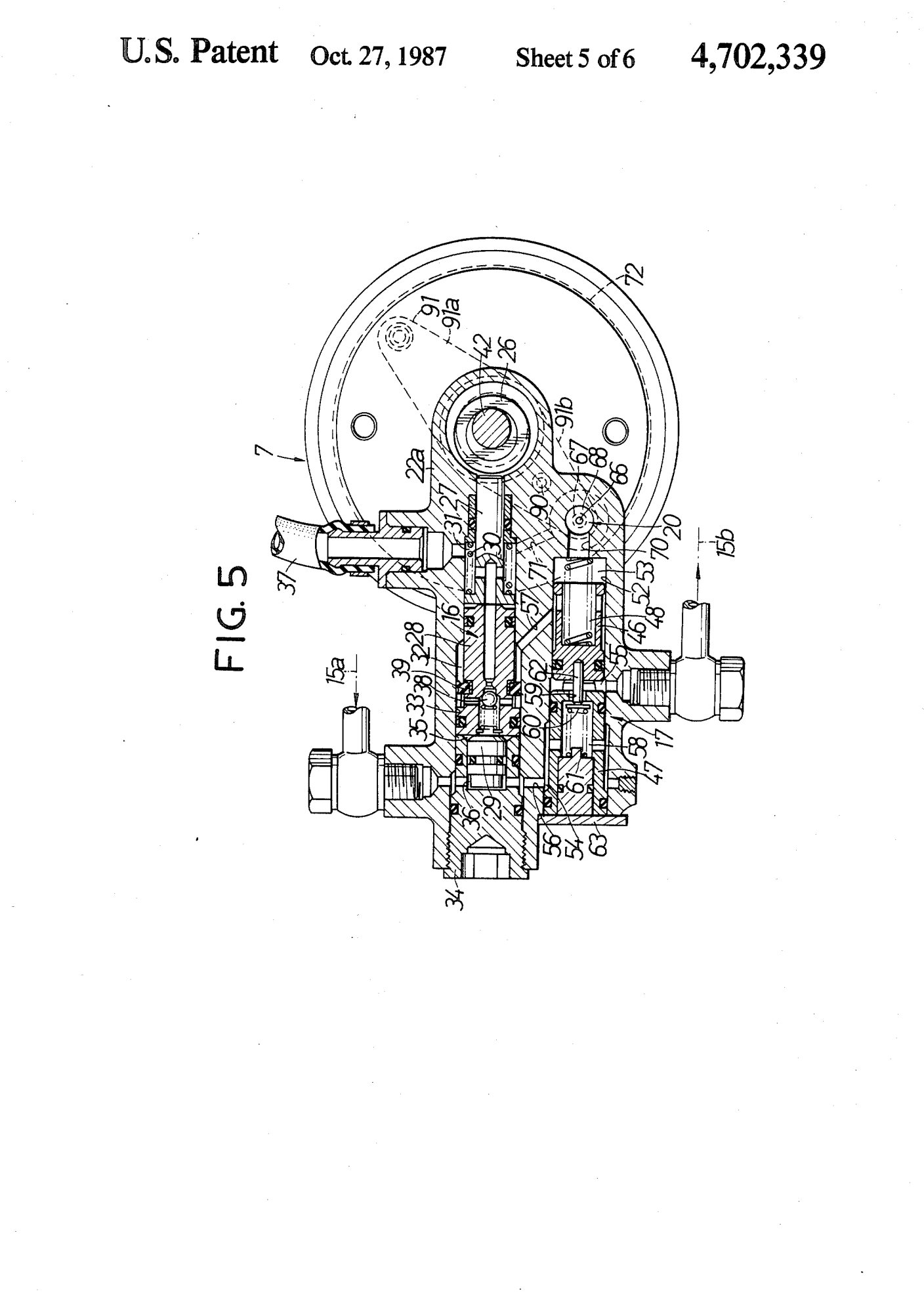

As shown in FIGS. 4 and 5, the casing 22 of the anti-lock controlling unit C includes a casing body 22a supporting the drive shaft 42 rotatably via bearings 40 and 40', and a cup-shaped cover 22b fitted to one end of the casing body 22a to define a sensor chamber 23 between the cover 22b and the casing body 22a. A hydraulic pump 16, a modulator 17, and a discharge valve 20, and an inertia-type wheel angular deceleration sensor 21 are provided within this casing 22.

The hydraulic pump 16 comprises an eccentric cam 26 formed on the drive shaft 42 between the two bearings 40 and 40', a push rod 27 having an inner end opposed to this eccentric cam 26, a pump piston 28 placed into abutting engagement with the outer end of this push rod 27, an operating piston 29 in abutting engagement with the outer end of the pump piston 28, a return spring 30 for urging the push rod 27 in a direction departing from the eccentric cam 26.

The push rod 27 and the pump piston 28 are slidably fitted into a first cylinder bore 33 formed in the casing body 22a so as to define an inlet chamber 31 and an outlet chamber 32 around its outer periphery. Additionally, a plug 34 is fitted into the outer end portion of the first cylinder bore 33 so as to define a pump chamber 35 between the plug 34 and the pump piston 28, while the operating piston 29 is slidably fitted into this plug 34 to define a hydraulic chamber 36.

The inlet chamber 31 communicates with the oil tank 19 via a conduit 37 and also communicates with the pump chamber 35 via a suction valve 38. The pump chamber 35 communicates with the outlet chamber 32 via a unidirectionally sealing member 39 having the function of a delivery valve. Additionally, the hydraulic chamber 36 is connected with an upstream pipe 10a of the hydraulic conduit 10 so as to constantly communicate with the output port Ma of the master cylinder M.

The modulator 17 comprises a pressure-reducing piston 46, a fixed piston 47 for receiving one end of this pressure-reducing piston 46 in order to restrict its retracting limit, and a return spring 48 for urging the pressure-reducing piston 46 in a direction to abut against the fixed piston 47. The two pistons 46 and 47 are slidably fitted into a second cylinder bore 52 formed in the casing body 22a adjacent the first cylinder bore 33.

In the second cylinder bore 52, the pressure-reducing piston 46 forms a controlling hydraulic chamber 53 between itself and the inner end wall of the second cylinder bore 52 and, at the same time, forms an output hydraulic chamber 55 against the fixed piston 47. The fixed piston 47 forms an input hydraulic chamber 54 around its outer periphery. This input hydraulic chamber 54 communicates with the hydraulic chamber 36 of the aforementioned hydraulic pump 16 via an oil passage 56, while the output hydraulic chamber 55 is connected to a downstream pipe 10b of the aforementioned hydraulic conduit 10 so as to constantly communicate with the input port 9a of the rear wheel brake B. The controlling hydraulic chamber 53 is communicated with the outlet chamber 32 of the aforementioned hydraulic pump 16 via the oil passage 57.

The fixed piston 47 has a valve chamber 58 constantly communicating with the input hydraulic chamber 54 as well as a valve port 59 for connecting this valve chamber 58 with the output hydraulic chamber 55. A valve 60 capable of opening and closing the valve port 59 and a valve spring 61 for urging, this valve 60 toward the closing side are housed in the valve chamber 58. In addition, a valve opening rod 62 for opening the valve 60 is provided on one end surface of the pressure reducing piston 46 so as to project from the same. This valve opening rod 62 maintains the valve 60 in the opened state when the pressure reducing piston 46 is situated at its retracting limit.

The outer opening of the second cylinder bore 52 is closed by an end plate 63 secured to the casing body 22a. The fixed piston 47 is constantly held in contact with the end plate 63 by means of the resilient force of the return spring 48 or the hydraulic pressure introduced into the input and output hydraulic chambers 54 and 55.

The discharge valve 20 comprises a valve seat member 65 fitted into a stepped cylinder hole 64 of the casing body 22a, and a valve body 67 slidably fitted into the valve seat member 65 so as to open and close a valve port 66. The valve seat member 65 defines an inlet chamber 68 in a small-diameter portion of the stepped cylinder hole 64 and an outlet chamber 69 in a large-diameter portion thereof, both these chambers 68 and 69 being in communication with each other via the valve port 66. Additionally, the inlet chamber 68 is in communication with the controlling hydraulic chamber 53 of the aforementioned modulator 17, while the outlet chamber 69 is in communication with the inlet chamber 31 of the hydraulic pump 16 via an oil passage 71. Consequently, the outlet chamber 69 is in communication with the oil tank 19.

The wheel angular deceleration sensor 21 in the sensor chamber 23 comprises: a flywheel 72 rotatably and slidably supported on the drive shaft 42 via a bearing bushing 86; a cam mechanism 73 for transmitting the rotating torque of the drive shaft 42 to this flywheel 72 and for converting the overrunning rotation of the flywheel 72 to its axial displacement; and an outlet lever mechanism 74 capable of operating the discharge valve 20 in response to the axial displacement of the flywheel 72.

The cam mechanism 73 comprises: a driving cam plate 82 secured to the drive shaft 42; a driven cam plate 83 disposed so as to oppose this driving cam plate 82 in a relatively rotatable manner to the latter; and a thrust ball 84 which is engaged with cam recesses 82a and 83a on the opposing surfaces of the two cam plates 82 and 83.

Figure 6:
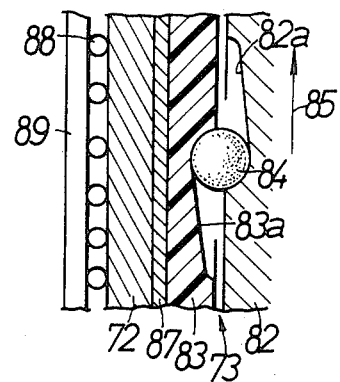

As shown in FIG. 6, the cam recess 82a of the driving cam plate 82 is inclined in such a manner that its bottom surface becomes shallower in a rotating direction 85 of the drive shaft 42, while the cam recess 83a of the driven cam plate 83 is inclined in such a manner that its bottom surface becomes deeper in the rotating direction 85. Accordingly, in normal operation where the driving cam plate 82 assumes its driving position with respect to the driven cam plate 83, the thrust ball 84 engages the deepest portions of the recesses 82a and 83a. Here, the driving cam plate 82 simply transmits the rotating torque received from the drive shaft 42 to the driven cam plate 83, with the result that relative rotation is not produced between two cam plates 82 and 83. However, in a reverse case where the driven cam plate 83 overruns with respect to the driving cam plate 82, relative rotation occurs between two cam plates 82 and 83. In this case, the thrust ball 84 rolls to climb inclined bottom surfaces of the two cam recesses 82a and 83a so as to impart a thrust force to the cam plates 82 and 83, with the result that an axial displacement occurs to the driven cam plate 83 in a direction departing from the driving cam plate 82.

The driven cam plate 83 is rotatably supported on a boss 72a of the flywheel 72 and, at the same time, is engaged with one side surface of the fly-wheel 72 via a frictional clutch plate 87. A pressing plate 89 is provided on the other side surface of the flywheel 72 via a thrust bearing 88.

The output lever mechanism 74 has a supporting shaft 90 provided on the casing body 22a so as to project therefrom at an intermediate position between the drive shaft 42 and the discharge valve 20, as well as a lever 91 supported by the end portion of the supporting shaft 90 so as to be swingable in the axial direction of the shaft 90. The lever 91 includes a long first arm 91a extending from the supporting shaft 90 in the manner bypassing a drive shaft 42, as well as a short second arm 91a extending from the supporting shaft 90 toward the discharge valve 20. A contacting portion 93 placed in contact with the outer surface of the aforementioned pressing plate 89 is formed at an intermediate portion of the first arm 91a in such a manner as to project substantially in a semi-spherical shape.

A spring 94 is provided between the end portion of the first arm 91 and the casing body 22a in a compressed manner. The end portion of the second arm 91b comes into contact with the outer end of the valve body 67 of the discharge valve 20.

The resilient force of the spring 94 acts on the lever 91 so as to press the contacting portion 93 of the first arm 91a against the pressing plate 89 and, at the same time, normally to press the valve body 67 of the discharge valve 20 so as to maintain the valve in its closed state. Furthermore, the pressing force which the pressing plate 89 receives from the spring 94 imparts a set amount of frictional engaging force to the flywheel 72, the frictional clutch plate 87 and the driven cam plate 83, and imparts an approaching force to the two cam plates 82 and 83.

Thus, the aforementioned frictional engaging force is set in such a manner that the frictional clutch plate 87 slides when more than a fixed value of rotating torque acts between the driven cam plate 83 and the flywheel 72.

Next, description will be made of an operation of this embodiment.

During travelling of the motorcycle, the drive shaft 42 of the anti-lock controlling unit C is constantly in an interlocked relationship with the rear wheel Wr since it is arranged to be driven by the propeller shaft 6 of the rear wheel drive device D via bevel gears 13 and 14 which device also drives the rear wheel Wr. Then, the drive shaft 42 drives the flywheel 72 via the cam mechanism 73 and the frictional clutch 87. Furthermore, since the propeller shaft 6 generally rotates at a speed faster than that of the rear wheel Wr so as to decelerate the rear wheel Wr, the flywheel 72 is rotated at a speed faster than that of the rear wheel Wr, thereby making it possible to generate a large rotating inertial force.

Now, if the master cylinder M is operated to apply a brake force to the rear wheel Wr, the output hydraulic pressure is transmitted to the rear brake B consecutively via the upstream pipe 10a of the hydraulic conduit 10, the hydraulic chamber 36 of the hydraulic pump 16, the input hydraulic chamber 54 of the modulator 17, the valve chamber 58, the valve port 59, the output hydraulic chamber 55, and the downstream pipe 10b of the hydraulic conduit 10. Thus, the braking force is applied to the rear wheel Wr by operating these parts consecutively.

Meanwhile, in the hydraulic pump 16, since the output hydraulic pressure of the master cylinder M is introduced into the hydraulic chamber 36, a reciprocating motion is caused at the pump piston 28 by the pressing action of the hydraulic pressure against the operating piston 29 and the lifting action of the eccentric cam 26 with respect to the push rod 27. Then, in the suction stroke in which pump piston 28 is moved toward the push rod 27, the suction valve 38 is opened and the oil in the oil tank 19 is sucked from the conduit 37 into the pump chamber 35 via the inlet chamber 31. In the delivery stroke in which the pump piston 28 is moved to the side of the operating piston 29, the unidirectionally sealing member 39 undergoes a valve-opening operation, and the oil in the pump chamber 35 is sent to the outlet chamber 32 and further to the controlling hydraulic chamber 53 of the modulator 17 via the oil passage 57. Then, when the pressure of the outlet chamber 32 and the controlling hydraulic chamber 53 rises to a predetermined value, the pump piston 28 is maintained at its contacting position with the plug 34 by the pressure of the outlet chamber 32.

Since communication between the controlling hydraulic pressure 53 of the modulator 17 and the oil tank 19 is interrupted by closure of the discharge valve 20, the hydraulic pressure supplied from the hydraulic pump 16 to the chamber 53 directly acts upon the pressure-reducing piston 46 and pushes the same in its retracted position, maintaining the valve 60 in its open state by means of the valve-opening rod 62, and allows the passage of the output hydraulic pressure of the master cylinder M therethrough.

Accordingly, during the initial stage of braking operation, the braking force applied to the rear brake B is proportional to the output hydraulic pressure of the master cylinder M.

When an angular deceleration occurs to the rear wheel Wr during this braking operation, the flywheel 72 detects the deceleration and works to effect an over-runing rotation with respect to the drive shaft 42 due to its inertial force. The rotating moment of the flywheel at this time generates a relative rotation in the two cam plates 82 and 83, and a thrust is generated by the rolling of the thrust ball 84 to axially displace the flywheel 72, thereby causing the pressing plate 89 to press the lever 91. In the stage where there is no possibility of the rear wheel Wr being locked, however, the angular deceleration of the rear wheel Wr is low and is not enough to swing the lever 91.

However, if the rear wheel Wr is about to be locked as the result of an excessive braking force or a decrease in the frictional coefficient of the road surface, the angular deceleration of the rear wheel Wr rapidly increases to raise the pressing force of the pressing place 89 above a predetermined value, resulting in that the lever 91 swings with the supporting shaft 90 as its fulcrum so as to compress the spring 94. Consequently, the second arm 91b of the lever 91 swings to move apart from the valve body 67, thereby rendering the discharge valve 20 in its open stage.

When the discharge valve 20 is opened, the hydraulic pressure in the controlling hydraulic chamber 53 is discharged into the oil tank 19 via the oil passage 70, the inlet chamber 68, the valve port 66, the outlet chamber 69, the oil passage 71, the inlet chamber 31 of the hydraulic pump 16, and the conduit 37. As a result, the pressure-reducing piston 46 is moved to the side of the controlling hydraulic chamber 53 in opposition to the force of the return spring 48 by means of the hydraulic pressure of the output hydraulic chamber 55, which in turn causes the valve-opening rod 62 to retract to close the valve 60, whereby the communication between the input and output hydraulic chambers 54 and 55 is interrupted and the volume of the output hydraulic chamber 55 increases. Consequently, the input hydraulic pressure of the rear brake B drops and the braking force of the rear wheel Wr declines, thereby preventing a locking phenomenon of the rear wheel Wr. Then, since the pressing force of the pressing plate 89 against the lever 91 is released as a result of the acceleration of rotation of the rear wheel Wr, the lever 91 is swung to return to its original position by the resilent force of the spring 94, thereby rendering the discharge valve 20 in its closed state. When the discharge valve is closed, the hydraulic pressure delivered from the hydraulic pump 16 is immediately sealed in the controlling hydraulic chamber 53, and the pressure-reducing piston 46 retracts to the side of the output hydraulic chamber 55 so as to increase the pressure in said chamber 55, thereby recovering the braking force. As the above operation is repeated at a high speed, the rear wheel Wr can be braked efficiently.

Since the anti-lock controlling unit C is installed on the rear fork 3 in close proximity to the pivot shaft 2, the lifting and descending stroke of the rear fork 3 during swinging motion thereof is far smaller than that of the rear wheel Wr. Consequently, it becomes possible to minimize the effect exerted by the vertical rocking of the rear fork 3 on the performance of the anti-lock controlling unit C. Moreover, the amount of deflection of the upstream pipe 10a of the hydraulic conduit 15 and the conduit 37 that connect between the anti-lock controlling unit C and the master cylinder M as well as the oil tank 19, respectively, is made small, so that there is no need to allow an otherwise large deflection for these portions, which is extremely advantageous in terms of piping. Moreover, as the anti-lock controlling unit C is disposed in close proximity to the pivot shaft 2, it becomes possible to locate the unit C, master cylinder M, and the oil tank 19 in the central portion of the motorcycle body in a concentrated manner. As a result, all the conduits 10a, 18, and 37 excluding the downstream pipe 10b can be arranged in a concentrated manner, which becomes further advantageous in terms of piping.

In addition, although the anti-lock controlling unit C positioned close to the pivot shaft 2 has a weighty flywheel 72, the vertical rocking of the rear fork 3 is effected smoothly since the inertia moment of the rear fork 3 surrounding the pivot shaft 2 is not made large.

Furthermore, as illustrated in the drawings, if the anti-lock controlling unit C is disposed between the both fork legs 3l and 3r, it becomes possible to make effective use of the dead space between the two fork legs 3l and 3r and, at the same time, it becomes possible to minimize the effect of the external disturbance to which said unit C may be subjected.

FIGS. 7 and 8 show a second embodiment of the present invention, which differs from the aforementioned embodiment in the structure of the rear wheel drive device D and the structure of coupling between the same and the anti-lock controlling unit C.

In other words, the rear wheel drive device D is a wrap-around type transmission unit, and more particularly of a chain-driven type comprising a small-diameter drive sprocket 95 secured to the output shaft of the engine E, a large-diameter driven sprocket 96 secured to the hub of the rear wheel Wr, and an endless chain 97 entrained between the two sprockets 95 and 96. The anti-lock controlling unit C is installed via a bracket 99 on the left-side fork leg 3l extending substantially in parallel and in close proximity to the endless chain 97. A sprocket 100 is secured to the drive shaft 42 and engages with the endless chain 97. The diameter of the sprocket 100 is formed smaller than that of the drive sprocket 95. To effect a positive engagement between this sprocket 100 and the endless chain 97, a tension roller 101 for imparting tension to the endless chain 97 between the drive sprocket 95 and the sprocket 100 is pivotally supported as at 103 by a bracket 102 on the fork leg 3l.

Thus, while the rear wheel Wr is driven by the rear wheel drive device D, the anti-lock controlling unit C is driven at a speed faster than the rear wheel Wr by means of the endless chain 97 via the sprocket 100.

Since the other arrangements are the same as of the first embodiment, the portions corresponding to those of the first embodiment are given identical reference numerals and characters in the drawings.

What is claimed is:
1. In a motorcyle having a rear wheel pivotally supported on a rear end of a rear fork, said rear fork being coupled to a vehicle frame via a pivot shaft for vertical swinging motion, a rear wheel drive device for coupling between said rear wheel and an output shaft of an engine mounted on said vehicle frame being disposed side by side with said rear fork and being operable to indicate a rotational speed of said rear wheel, a rear wheel braking apparatus which comprises: a master cylinder installed on said vehicle frame; a rear wheel brake operable by an output hydraulic pressure of said master cylinder to apply a braking force to said rear wheel; and an anti-lock controlling unit incorporated with an inertia-type wheel angular deceleration sensor operatively conected with said rear wheel, said unit controlling a hydraulic pressure to be inputted to said rear wheel brake in response to an output from the sensor, wherein said anti-lock controlling unit is installed on said rear fork in close proximity to said pivot shaft, wherein a drive shaft of said sensor is coupled with said rear wheel drive device and wherein said master cylinder is disposed in a vicinity of said anti-lock controlling unit and hydraulically coupled therewith.

2. A rear wheel braking apparatus according to claim 1, wherein said rear wheel drive device is of a shaft-drive type.

3. A rear wheel braking apparatus according to claim 1, wherein said rear wheel drive device is of a wrap-around transmission type.

4. A rear wheel braking apparatus according to claim 3, wherein said rear wheel drive device comprises a drive sprocket secured to the output shaft of said engine, a driven sprocket secured to said rear wheel, and an endless chain entrained between these drive and driven sprockets, and wherein a sprocket in engagement with said endless chain is secured to the drive shaft of said sensor.

5. A rear wheel braking apparatus according to claim 4, wherein a tension roller for imparting tension to said endless chain is provided on said rear fork at a position between said drive sprocket and the sprocket of said sensor.

6. In a motorcycle having a rear wheel pivotally supported on a rear end of a rear fork, said rear fork being coupled to a vehicle frame via a pivot shaft for vertical swinging motion, a rear wheel drive device for coupling between said rear wheel and an output shaft of an engine mounted on said vehicle frame being disposed side by side with said rear fork, said rear wheel drive device being of a shaft drive type and being operable to indicate a rotational speed of the rear wheel, said rear fork having a fork leg with a hollow transmission chamber formed therein, a propeller shaft of said rear wheel drive device being housed in said transmission chamber,
a rear wheel braking apparatus which includes a master cylinder installed on said vehicle frame; a rear wheel brake operable by an output hydraulic pressure of said master cylinder to apply a braking force to said rear wheel; and an anti-lock controlling unit incorporated with an inertia-type wheel angular deceleration sensor operatively connected with said rear wheel, said unit controlling a hydraulic pressure to be inputted to said rear wheel brake in response to an output from the sensor, wherein said anti-lock controlling unit is installed on said rear fork in close proximity to said pivot shaft, wherein a drive shaft of said sensor is coupled with said rear wheel drive device, said drive shaft of said sensor being coupled with said propeller shaft via a gear mechanism and wherein said master cylinder is disposed adjacent the anti-lock controlling unit and is hydraulically coupled therewith.

7. A rear wheel braking apparatus according to claim 6, wherein the drive shaft of said sensor is projected through an inner surface of said fork leg into said transmission chamber.

8. In a motorcyle having a rear wheel pivotally supported on a rear end of a rear fork, said rear fork being coupled to a vehicle frame via a pivot shaft for vertical swinging motion, a rear wheel drive device for coupling between said rear wheel and an output shaft of an engine mounted on said vehicle frame being disposed side by side with said rear fork and being operable to indicate a rotational speed of the rear wheel,
said rear fork having a fork leg with a hollow transmission chamber formed therein,
a rear wheel braking apparatus which includes: a master cylinder installed on said vehicle frame; a rear wheel brake operable by an output hydraulic pressure of said master cylinder to apply a braking force to said rear wheel; and an anti-lock controlling unit incorporated with an inertia-type wheel angular deceleration sensor operatively connected with said rear wheel, said unit controlling a hydraulic pressure to be inputted to said rear wheel brake in response to an output from the sensor, wherein said anti-lock controlling unit is installed on said rear fork in close proximity to said pivot shaft, wherein a drive shaft of said sensor is coupled with said rear wheel drive device, said anti-lock controlling unit being provided inwardly of and adjacent said fork leg and wherein said master cylinder is disposed adjacent the anti-lock controlling unit and is hydraulically coupled therewith.

9. A rear wheel braking apparatus according to claim 8, wherein said rear fork has a pair of left and right fork legs, and said anti-lock controlling unit is secured to a cross member coupling between said fork legs.

10. A vehicle comprising a frame;
an engine mounted on said frame;
a rear suspension including a rear swing arm pivotally mounted to said frame;
a rear wheel mounted on said rear swing arm; a drive device coupling said engine to said rear wheel for providing engine power to said rear wheel;
a rear wheel brake on said swing arm adjacent said rear wheel;
an anti-lock brake system hydraulically coupled with said rear wheel brake and having an inertia-type wheel angular deceleration sensor, said sensor including a flywheel which is rotatably mounted on said rear swing arm between the pivotal mounting of said rear swing arm and said rear wheel brake, and a sensor drive coupled with said sensor and said drive device to drive said sensor; and a brake master cylinder mounted to said frame adjacent said anti-lock brake system and hydraulically coupled therewith.

11. The vehicle of claim 10 wherein said drive device includes a drive shaft extending rearwardly and coupled between said engine and said rear wheel, said sensor drive including a sensor drive shaft and a gear pair between said drive shaft and said sensor drive shaft.

12. The vehicle of claim 11 wherein said rear swing arm includes a rear fork having a fork leg with a hollow transmission chamber formed therein, said drive shaft being housed in said transmission chamber.

13. The vehicle of claim 12 wherein said sensor drive shaft projects through an inner surface of said fork leg into said transmission chamber.

14. The vehicle of claim 12 wherein said anti-lock brake system is provided inwardly of and adjacent said fork leg.

15. The vehicle of claim 10 wherein said drive device includes a drive sprocket coupled to the output of said engine, a driven sprocket coupled to said rear wheel and an endless chain about said drive sprocket and said driven sprocket, said sensor drive includes a sprocket engaged with said endless chain between said drive sprocket and said driven sprocket.

16. The vehicle of claim 10 wherein said drive device further includes a tension roller for imparting tension to said endless chain and rotatably mounted on said rear swing arm at a position between said drive sprocket and said sprocket of said sensor drive.

* * * * *

UNITED STATES PATENT AND TRADEMARK OFFICE
CERTIFICATE OF CORRECTION

PATENT NO. : 4,702,339

DATED : October 27, 1987

INVENTOR(S) : Tsutomu Hayashi et al.

It is certified that error appears in the above—identified patent and that said Letters Patent is hereby corrected as shown below:

In claim 16, line 1, please change "10" to -- 15 --.

Signed and Sealed this

Twenty-sixth Day of April, 1988

Attest:

DONALD J. QUIGG

*Attesting Officer*  *Commissioner of Patents and Trademarks*